United States Patent
Shah

(10) Patent No.: US 11,659,000 B2
(45) Date of Patent: May 23, 2023

(54) SYSTEM, METHODS, AND MEDIA FOR PROTECTING NETWORK DEVICES FROM MALICIOUS RICH TEXT FORMAT (RTF) FILES

(71) Applicant: McAfee, LLC, San Jose, CA (US)

(72) Inventor: Chintan Shah, Bangalore (IN)

(73) Assignee: McAfee, LLC, San Jose, CA (US)

( * ) Notice: Subject to any disclaimer, the term of this patent is extended or adjusted under 35 U.S.C. 154(b) by 210 days.

(21) Appl. No.: 16/953,865

(22) Filed: Nov. 20, 2020

(65) Prior Publication Data

US 2022/0086172 A1    Mar. 17, 2022

(30) Foreign Application Priority Data

Sep. 17, 2020   (IN) .............................. 202011040344

(51) Int. Cl.
*G06F 21/56* (2013.01)
*H04L 9/40* (2022.01)
*G06F 40/10* (2020.01)

(52) U.S. Cl.
CPC .......... *H04L 63/145* (2013.01); *G06F 21/562* (2013.01); *G06F 21/563* (2013.01); *G06F 40/10* (2020.01); *H04L 63/1416* (2013.01)

(58) Field of Classification Search
CPC . H04L 63/145; H04L 63/1416; G06F 21/563; G06F 40/10; G06F 40/143; G06F 21/568; G06F 21/562
See application file for complete search history.

(56) References Cited

U.S. PATENT DOCUMENTS

| 10,009,370 B1* | 6/2018 | Douglas | H04L 63/1433 |
| 2014/0101764 A1* | 4/2014 | Montoro | H04L 67/02 726/23 |
| 2016/0352762 A1* | 12/2016 | Friedlander | H04L 63/1425 |

FOREIGN PATENT DOCUMENTS

| CN | 109871685 A | * | 6/2019 |
| CN | 112182569 A | * | 1/2021 |
| RU | 2628922 C1 | * | 8/2017 |

(Continued)

OTHER PUBLICATIONS

"How to detect overlay data in RTF files?", retrieved online from <https://reverseengineering.stackexchange.com/questions/16405/how-to-detect-overlay-data-in-rtf-files>, obtained on Aug. 13, 2022 (Year: 2017).*

(Continued)

*Primary Examiner* — Farid Homayounmehr
*Assistant Examiner* — Zhimei Zhu
(74) *Attorney, Agent, or Firm* — Byrne Poh LLP

(57) ABSTRACT

Mechanisms, which can include systems, method, and media, for protecting network devices from malicious rich text format (RTF) files are provided, the mechanisms comprising: intercepting an RTF file destined for a network device; parsing the RTF file to identify a plurality of objects in the RTF file; checking a first object of the plurality of objects for a first heuristic; based upon an outcome of the checking of the first object for the first heuristic, increasing a cumulative weight by a first weight value; comparing the cumulative weight against at least one threshold to classify the RTF file; and based on the classification of the RTF file, taking a protective action on the RTF file.

17 Claims, 15 Drawing Sheets

(56) References Cited

FOREIGN PATENT DOCUMENTS

WO        WO-03017114 A1 * 2/2003 ............. G06Q 10/10

OTHER PUBLICATIONS

Chintan Shah, "An Inside Look into Microsoft Rich Text Format and OLE Exploits", Jan. 24, 2020, obtained online from <https://www.mcafee.com/blogs/other-blogs/mcafee-labs/an-inside-look-into-microsoft-rich-text-format-and-ole-exploits/>, retrieved on Dec. 15, 2022 (Year: 2020).*

* cited by examiner

US 11,659,000 B2

SYSTEM, METHODS, AND MEDIA FOR PROTECTING NETWORK DEVICES FROM MALICIOUS RICH TEXT FORMAT (RTF) FILES

CROSS-REFERENCE TO RELATED APPLICATION

This application claims the benefit of Indian Patent Application No. 202011040344, filed Sep. 17, 2020, which is hereby incorporated by reference herein in its entirety.

BACKGROUND

Over the past few years, Microsoft™ Rich Text Format (MS-RTF) files have been gaining massive popularity in phishing attacks. The wide adoption of such MS-RTF files in various targeted attack campaigns is attributed to the ability of these RTF files to host wide variety of objects (e.g., fonts, ActiveX controls, images, Flash files, Microsoft™ Office Open XML (MS-OOXML) files, Object Linking and Embedding 2 (OLE2) documents, Adobe Reader PDF documents, etc.), and the fact that a vulnerability in any of these objects in an RTF file can lead to compromise of a system. Additionally, attackers can use specific sections of the RTF file to hide additional malicious resources like executable files or exploit payloads, decoy documents, encryption keys, shellcodes, etc. Because of an in-built feature of RTF files called Object Linking and Embedding (OLE), RTF files can also be linked to external malicious code, which can be downloaded and executed on a target system. For at least the above reasons, it is important for network security solutions and network traffic inspection solutions to perform deep inspection of MS-RTF files on networks, classify them based on the applied inspection methods, and take appropriate response action.

SUMMARY

In accordance with some embodiments, systems, methods, and media for protecting network devices from malicious rich text format files are provided. In some embodiments, systems for protecting network devices from malicious rich text format (RTF) files are provided, the systems comprising: memory; and a hardware processor coupled to the memory and configured to: intercept an RTF file destined for a network device; parse the RTF file to identify a plurality of objects in the RTF file; check a first object of the plurality of objects for a first heuristic; based upon an outcome of the checking of the first object for the first heuristic, increase a cumulative weight by a first weight value; compare the cumulative weight against at least one threshold to classify the RTF file; and based on the classification of the RTF file, take a protective action on the RTF file.

In some of these embodiments, the hardware processor is further configured to: based upon the outcome of the checking of the first object for the first heuristic, check the first object for a second heuristic; and based upon an outcome of the checking of the first object for the second heuristic, increase the cumulative weight by a second weight value.

In some of these embodiments, the protective action includes quarantining the RTF file.

In some of these embodiments, the hardware processor is further configured to: identify a non-object-linking-and-embedding control word in the RTF file; and check a data stream associated with the non-object-linking-and-embedding control word for at least one of: static shell code; dynamic shellcode; an embedded file; a Flash file; encryption; a sledge, and return-oriented-programming code.

In some of these embodiments, the hardware processor is further configured to: identify overlay data in the RTF file; determine a length of the overlay data; and increase the cumulative weight if the length of the overlay data is greater than a threshold.

In some of these embodiments, the hardware processor is further configured to: identify a Microsoft™ Office Open XML (MS-OOXML) file in the RTF file; and increase the cumulative weight based on the contents of the MS-OOXML file.

In some of these embodiments, the hardware processor is further configured to: identify a Microsoft™ Compound File Binary (MS-CFB) file in the RTF file; and increase the cumulative weight based on the contents of the MS-CFB file.

In some embodiments, methods for protecting network devices from malicious rich text format (RTF) files are provided, the methods comprising: intercepting an RTF file destined for a network device; parsing the RTF file to identify a plurality of objects in the RTF file; checking a first object of the plurality of objects for a first heuristic; based upon an outcome of the checking of the first object for the first heuristic, increasing a cumulative weight by a first weight value; comparing the cumulative weight against at least one threshold to classify the RTF file; and based on the classification of the RTF file, taking a protective action on the RTF file.

In some of these embodiments, the methods further comprise: based upon the outcome of the checking of the first object for the first heuristic, checking the first object for a second heuristic; and based upon an outcome of the checking of the first object for the second heuristic, increasing the cumulative weight by a second weight value.

In some of these embodiments, the protective action includes quarantining the RTF file.

In some of these embodiments, the methods further comprise: identifying a non-object-linking-and-embedding control word in the RTF file; and checking a data stream associated with the non-object-linking-and-embedding control word for at least one of: static shell code; dynamic shellcode; an embedded file; a Flash file; encryption; a sledge, and return-oriented-programming code.

In some of these embodiments, the methods further comprise: identifying overlay data in the RTF file; determining a length of the overlay data; and increasing the cumulative weight if the length of the overlay data is greater than a threshold.

In some of these embodiments, the methods further comprise: identifying a Microsoft™ Office Open XML (MS-OOXML) file in the RTF file; and increasing the cumulative weight based on the contents of the MS-OOXML file.

In some of these embodiments, the methods further comprise: identifying a Microsoft™ Compound File Binary (MS-CFB) file in the RTF file; and increasing the cumulative weight based on the contents of the MS-CFB file.

In some embodiments, non-transitory computer-readable medium containing computer executable instructions that, when executed by a processor, cause the processor to perform a method for protecting network devices from malicious rich text format (RTF) files are provided, the method comprising: intercepting an RTF file destined for a network device; parsing the RTF file to identify a plurality of objects in the RTF file; checking a first object of the plurality of objects for a first heuristic; based upon an outcome of the checking of the first object for the first heuristic, increasing a cumulative weight by a first weight value; comparing the cumulative weight against at least one threshold to classify the RTF file; and based on the classification of the RTF file, taking a protective action on the RTF file.

In some of these embodiments, the method further comprises: based upon the outcome of the checking of the first object for the first heuristic, checking the first object for a second heuristic; and based upon an outcome of the checking of the first object for the second heuristic, increasing the cumulative weight by a second weight value.

In some of these embodiments, the protective action includes quarantining the RTF file.

In some of these embodiments, the method further comprises: identifying a non-object-linking-and-embedding control word in the RTF file; and checking a data stream associated with the non-object-linking-and-embedding control word for at least one of: static shell code; dynamic shellcode; an embedded file; a Flash file; encryption; a sledge, and return-oriented-programming code.

In some of these embodiments, the method further comprises: identifying overlay data in the RTF file; determining a length of the overlay data; and increasing the cumulative weight if the length of the overlay data is greater than a threshold.

In some of these embodiments, the method further comprises: identifying a Microsoft™ Office Open XML (MS-OOXML) file in the RTF file; and increasing the cumulative weight based on the contents of the MS-OOXML file.

DETAILED DESCRIPTION

In accordance with some embodiments, mechanisms (which can include systems, methods, and media) for heuristic-based, deep-file network inspection of Microsoft™ Rich Text Format (RTF) files are provided.

In some embodiments, these mechanisms work by parsing the structure of an RTF file, applying detection heuristics to classify the file, and taking a responsive action (e.g., blocking, quarantining, deleting, etc.) to mitigate a threat presented by the file.

In some embodiments, these mechanisms can be a part of a network traffic inspection device, a sandboxed replication-based security solutions, a gateway security solution, and/or any other device, system, or mechanism that has the capability to extract an RTF file from network traffic and process it as described herein.

Figure 1A:
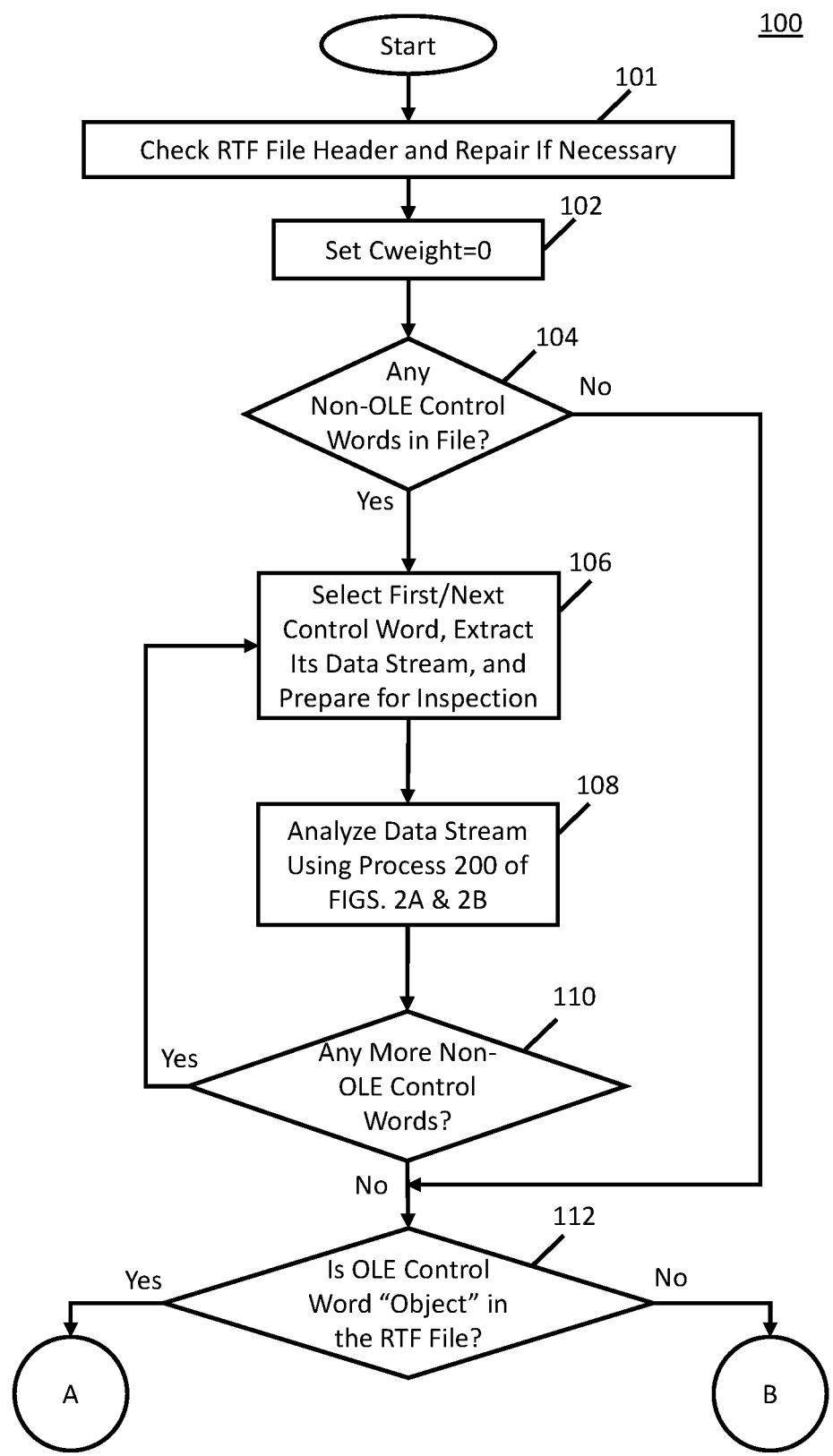
FIGS. 1A, 1B, and 1C show an example of a process for analyzing Microsoft™ Rich Text Format (MS-RTF) files in accordance with some embodiments.
Figure 1B:
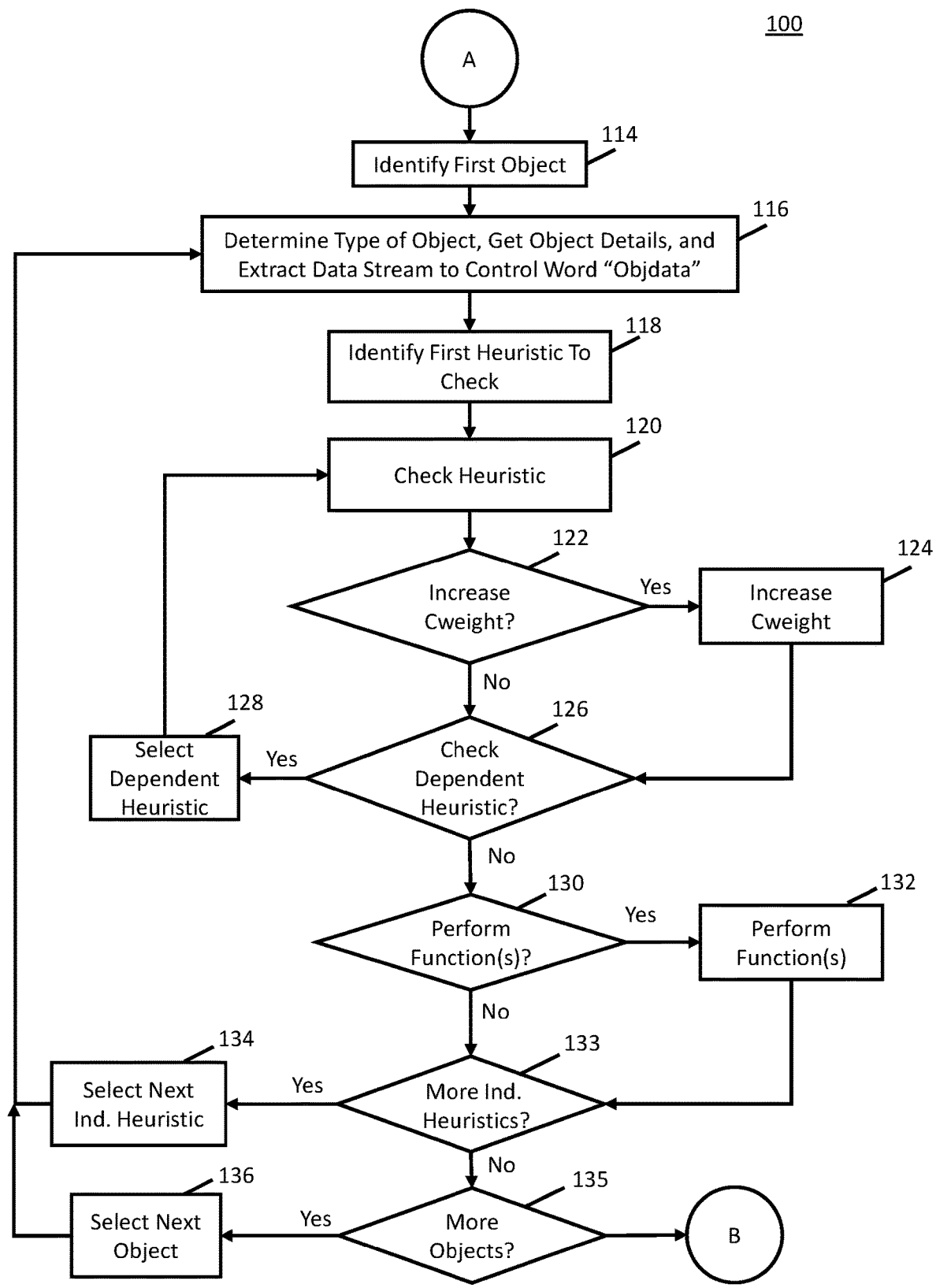
Figure 1C:
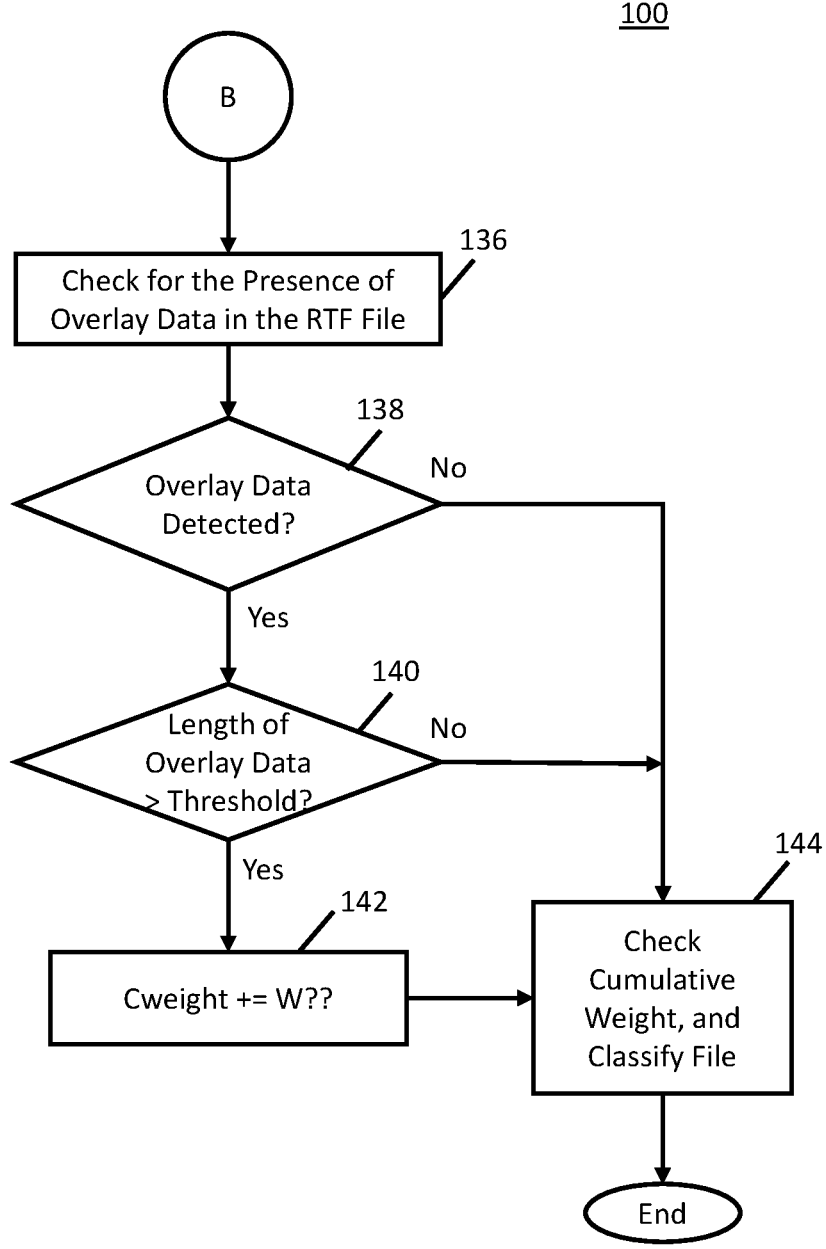

Turning to FIGS. 1A, 1B, and 1C, an example 100 of a process for parsing and analyzing an RTF file in accordance with some embodiments is shown. As illustrated, after process 100 begins, the process can check the header of the RTF file and repair it if necessary. The header can be checked and repaired in any suitable manner.

Next, at 102, process 100 sets a cumulative weight (Cweight) for the file to zero at 102. As described further below, this cumulative weight may be increased as the file is analyzed based on characteristics of the file by adding different weights (e.g., W1 to W44) to Cweight. When the analysis of the RTF file is complete, Cweight can be compared to thresholds to determine whether the RTF file is "Clean," "Suspicious," or "Malicious," in some embodiments. More particularly, for example, in some embodiments:

"Clean" means that, after the application of all the heuristics, the cumulative weight Cweight does not cross a clean score threshold, Tclean (i.e., Cweight<=Tclean or Cweight<Tclean).

"Suspicious" means that, after the application of all the heuristics, the cumulative weight Cweight crosses the clean score threshold, Tclean, but does not cross the suspicious score threshold, Tsusp (i.e., Tclean<=Cweight<=Tsusp or Tclean<Cweight<Tsusp).

"Malicious" means that, after the application of all the heuristics, the cumulative weight Cweight crosses the suspicious score threshold, Tsusp (i.e., Cweight>Tsusp or Cweight>=Tsusp).

W1-W44, Tclean, and Tsusp can have any suitable values in some embodiments. For example, in some embodiments, W1-W44 can have values ranging from 0.1 to 1, 1 to 10, 1 to 100, or any other suitable range. As another example, Tclean can be equal to 33% (or any other suitable percentage) of the sum of all possible weights (e.g., if all of the weights total 100, then Tclean can equal 33). As yet another example, Tsusp can be equal to 67% (or any other suitable percentage) of the sum of all possible weights (e.g., if all of the weights total 100, then Tclean can equal 67).

At 104, process 100 can next determine whether there are any non-OLE control words in the RTF file whose data streams should be inspected. This determination can be made in any suitable manner. For example, in some embodiments, process 100 can scan the RTF file to determine if certain non-OLE control words are present by, for example, comparing words in the RTF file to non-OLE control words of interest in a database (or any other suitable structure).

Then, at 105, process 100 can select the first word (or next word if a word has previously been selected by process 100), extract a data stream for the word, and prepare the control word and data stream for inspection. This selection, extraction, and preparation can be performed in any suitable manner in some embodiments.

At 106, process 100 can analyze the extracted data stream. This analysis can be performed in any suitable manner. For example, in some embodiments, the analysis can be performed as shown in connection with example process 200 of FIGS. 2A and 2B.

Figure 2A:
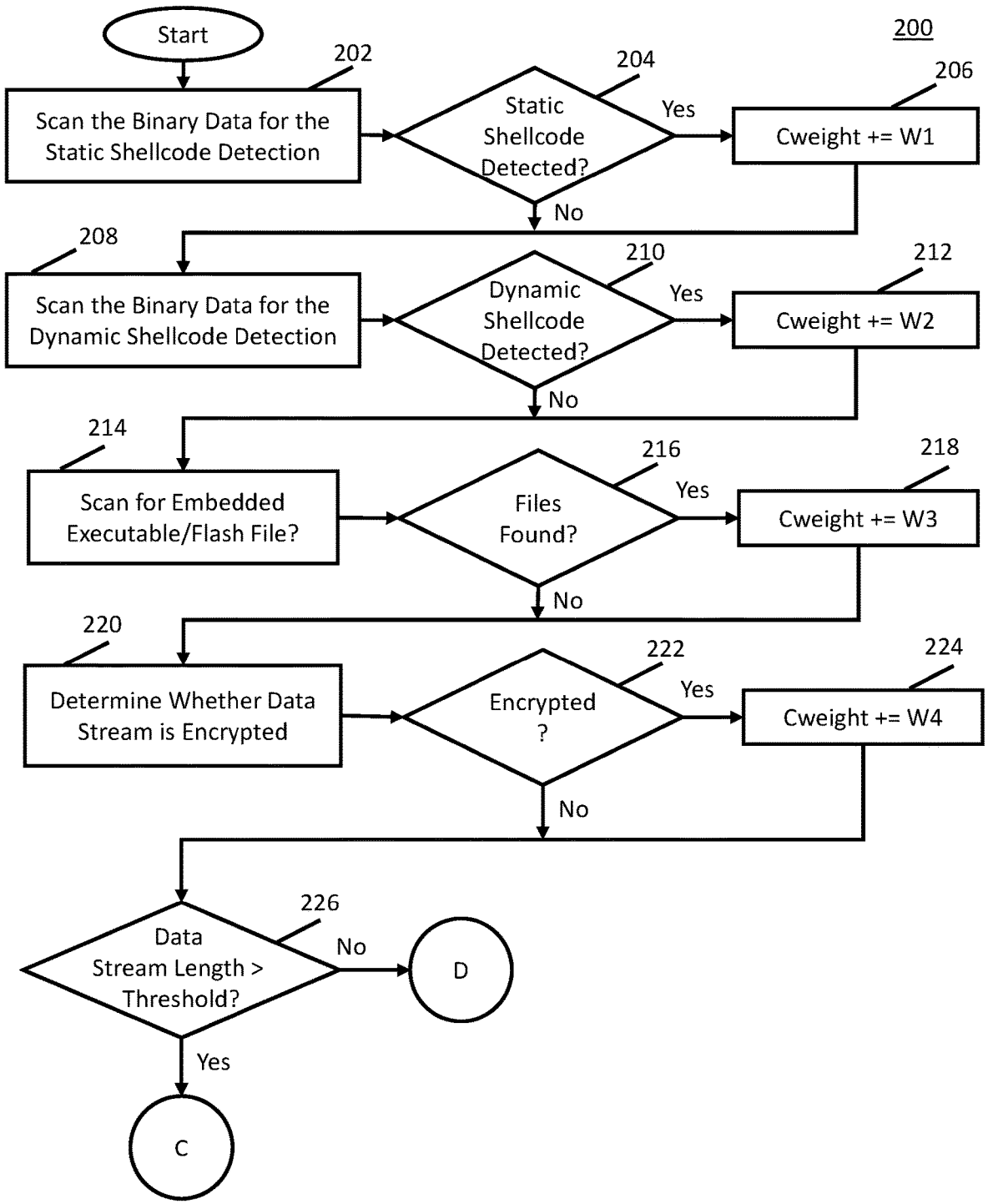
FIGS. 2A and 2B show an example of a process for analyzing data streams in accordance with some embodiments.

Turning to FIG. 2A, after process 200 begins, the process can first scan the binary data of the data stream for static shellcode at 202. This scanning can be performed in any suitable manner in some embodiments. For example, this scanning can be done by matching the data stream with known shellcode bytes patterns kept in a file.

At 204, process 200 can determine if static shellcode is detected, and, if so, at 206, increase Cweight by weight W1, which can have any suitable value. After increasing Cweight at 206 or determining that static shellcode is not detected at 204, process 200 can branch to 208.

At 208, the process can scan the binary data of the data stream for dynamic shellcode. This scanning can be performed in any suitable manner in some embodiments. For example, in some embodiments, this scanning can be done by emulating the data of the data stream on x86 based software emulator to check if it looks like x86 CPU instructions. Then, at 210, process 200 can determine if dynamic shellcode is detected, and, if so, at 212, increase Cweight by weight W2, which can have any suitable value. After increasing Cweight at 212 or determining that static shellcode is not detected at 210, process 200 can branch to 214.

At 214, process 200 can scan the binary data of the data stream for one or more embedded files. This scanning can be performed in any suitable manner in some embodiments, and any suitable file type can be identified. For example, this scanning can be done by looking for an executable file header (e.g., which may include "MZ"), a Flash file header (e.g., which may include "CWS" and/or "SWF"), and/or a PDF file header (e.g., which may include "% PDF") in the data stream. Then, at 216, process 200 can determine if embedded file(s) are detected, and, if so, at 218, increase Cweight by weight W3, which can have any suitable value. After increasing Cweight at 218 or determining that static shellcode is not detected at 216, process 200 can branch to 220.

At 220, process 200 can check whether the data stream is encrypted. This check can be made in any suitable manner in some embodiments. For example, in some embodiments, process 200 can use brute force in an attempt to find an XOR encryption key that, when XORed with the stream, results in an executable file. The XOR encryption key can have any suitable length, such as eight bits, in some embodiments. Brute force can include attempting to decrypt the data stream by XORing it with every possible eight-bit value (i.e., 0x00 to 0xFF) and checking the result to determine if it includes an executable file header. For example, in some embodiments, an executable file header can start with "MZ" and includes "This program does not run under DOS mode".

At 222, process 200 can determine at 222 whether the data stream is encrypted. If so, at 224, process 200 can increase Cweight by weight W4. After increasing Cweight at 224 or if it was determined at 222 that the data stream was not encrypted, then process 200 can proceed to 226.

Next, at 226, process 200 can determine if the length of the data stream is greater than, or greater than or equal to a threshold. Any suitable threshold can be used in some embodiments. For example, in some embodiments, the threshold can be 1024 bytes. If the length of the data stream is determined to be greater than, or greater than or equal to, the threshold, then process 200 can proceed to 228 of FIG. 2B.

At 228, process 200 can use frequency analysis to try to decrypt the data stream. This frequency analysis can be performed in any suitable manner. For example, in some embodiments, process 200 can split the stream up into blocks. Any suitable size block, such as 256 bytes, can be used in some embodiments. Next, process 200 can identify the most-commonly occurring block and compare a count of occurrences of this block to a threshold, which threshold can have any suitable value (such as five) in some embodiments. If the count of occurrences of this block is greater than, or greater than or equal to, the threshold, then process 200 can use brute force to try to decrypt the most-commonly occurring block using encryption keys that match the block length. For example, brute force can include attempting to decrypt the most-commonly occurring 256-byte block by XORing it with every possible 256 byte value and checking the result to determine if it includes an executable file header or human readable text. For example, in some embodiments, an executable file header can start with "MZ" and can include "This program does not run under DOS mode". If process 200 is able to identify a executable file header or human readable text after XORing the most-commonly occurring block with a key, the key can be considered to be identified.

At 230, process 200 can determine if a key has been identified. If so, at 232, process 200 can increase Cweight by weight W5. After increasing Cweight at 232, if it was determined at 230 that a key was not identified, or if it was determined that the data stream is not greater than, or greater than or equal to, the threshold at 226, then process 200 can proceed to 234.

At 234, process 200 can scan the binary data of the data stream for a suspected sledge. This scanning can be performed in any suitable manner in some embodiments. For example, in some embodiments, this scanning can be done by dividing the bytes of the data stream into four-byte chunks, and checking these chunks to look for repeated memory addresses in a configured range.

Then, at 236, process 200 can determine if a suspected sledge is detected, and, if so, at 238, increase Cweight by weight W6, which can have any suitable value. After increasing Cweight at 238 or determining that a suspected sledge is not detected at 236, process 200 can branch to 240.

At 240, process 200 can scan the binary data of the data stream for a suspected return-oriented programming (ROP) chain. This scanning can be performed in any suitable manner in some embodiments. For example, in some embodiments, this scanning can be done by looking for chunks in the data stream that look like a chain of different consecutive or non-consecutive memory addresses.

Then, at 242, process 200 can determine if a suspected ROP chain is detected, and, if so, at 244, increase Cweight by weight W7, which can have any suitable value. After increasing Cweight at 244 or determining that a suspected ROA chain is not detected at 242, process 200 can branch to 246.

Finally, at 252, process 200 can return the cumulative weigh Cweight to the calling process.

Returning to FIG. 1A, after analyzing the data stream for the current control word, process 100 determines at 110 if there are any more non-OLE control words in the RTF file. This determination can be made in any suitable manner. For example, in some embodiments, this determination can be made by performing string matching of pre-selected control words in a file for their presence in the RTF file. If it is determined that there is one or more non-OLE control words in the RTF file, process 100 can loop back to 106 and proceed as described above. Otherwise, process 100 can proceed to 112.

At 112, process 100 can determine if the OLE control word "Object" is in the RTF file. This determination can be made in any suitable manner in some embodiments. For example, in some embodiments, this determination can be performed by string matching of "object" word in the RTF file. If process 100 determines that the OLE control word "Object" is in the RTF file, then process 100 can proceed to 114 of FIG. 1B.

At 114, process 100 can identify the first object identified by the OLE control word "Object". This identification can be made in any suitable manner in some embodiments.

Next, at 116, process 100 can determine the type of object, can retrieve the object details, and can extract the data stream to the control word "objdata". This determination, retrieval, and extraction can be made in any suitable manner in some embodiments.

Then, at 118, process 100 can identify the first heuristic to check against the currently OLE object. This identification can be made in any suitable manner in some embodiments. For example, in some embodiments, this identification can search for a first heuristic (such as an independent heuristic (e.g., heuristic #1)) in a data structure of heuristics, such as shown in Table 1 below.

TABLE 1

Figure 2B:
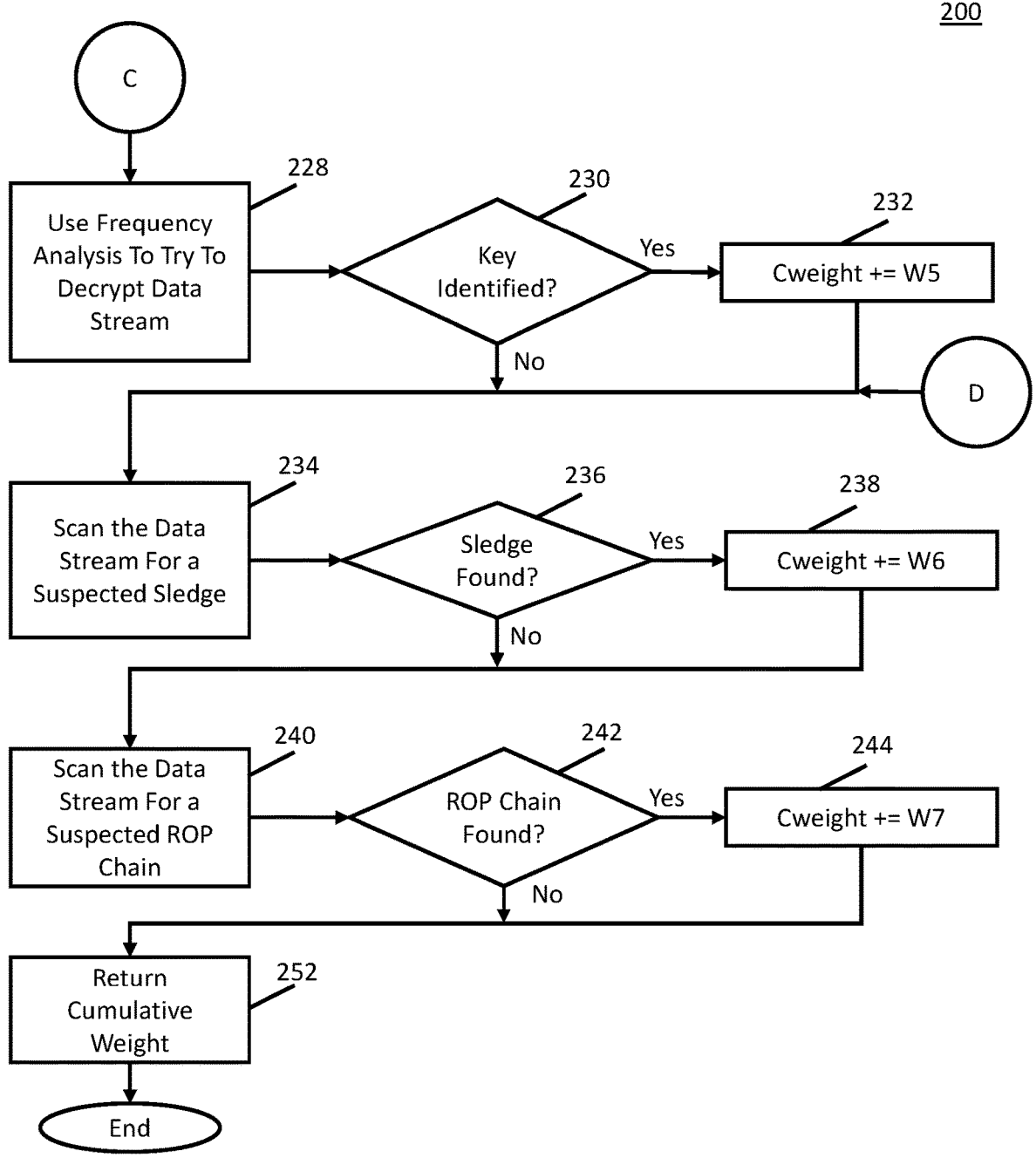

| Heuristic Type | Heuristic # | Heuristic Description | Heuristic True? | Weight Value | Dependent Heuristic # | Function |
|---|---|---|---|---|---|---|
| Ind. | 1 | Shellcode detected inside control word data via stream emulation | Yes | W8 | None | Analyze data stream using, for example, process 200 of FIGS. 2A and 2B |
|  |  |  | No | None | 2 | None |
| Ind. | 2 | Shellcode detected inside control word data via Static scanning | Yes | W9 | None | Analyze data stream using, for example, process 200 of FIGS. 2A and 2B |
|  |  |  | No | None | 3 | None |
| Ind. | 3 | Shellcode detected inside RTF file via static scanning | Yes | W10 | None | Analyze data stream using, for example, process 200 of FIGS. 2A and 2B |
|  |  |  | No | None | 4 | None |
| Ind. | 4 | Embedded Executable file detected inside RTF control word data | Yes | W11 | None | Analyze data stream using, for example, process 200 of FIGS. 2A and 2B |
|  |  |  | No | None | 5 | None |
| Ind. | 5 | Dynamic Data Exchange (DDE) links detected inside RTF file | Yes | W12 | 6 | None |
|  |  |  | No | None | 6 | None |
| Ind. | 6 | ASCII representation of Shellcode detected inside RTF file | Yes | W13 | None | Analyze data stream using, for example, process 200 of FIGS. 2A and 2B |
|  |  |  | No | None | 7 | None |
| Ind. | 7 | Overlay data detected | Yes | W14 | 8 | None |
|  |  |  | No | None | 10 | None |
| Dep. | 8 | Shellcode detected inside Overlay data via static scanning | Yes | W15 | None | Analyze data stream using, for example, process 200 of FIGS. 2A and 2B |
|  |  |  | No | None | 9 | None |
| Dep. | 9 | Shellcode detected inside Overlay data via stream emulation | Yes | W16 | None | Analyze data stream using, for example, process 200 of FIGS. 2A and 2B |
|  |  |  | No | None | 10 | None |
| Ind. | 10 | Excessive number of embedded objects detected inside RTF file | Yes | W17 | None | None |
|  |  |  | No | None | 11 | None |
| Ind. | 11 | OLE Package detected inside RTF file | Yes | W18 | 12 | None |
|  |  |  | No | None | 13 | None |

TABLE 1-continued

Figure 3A:
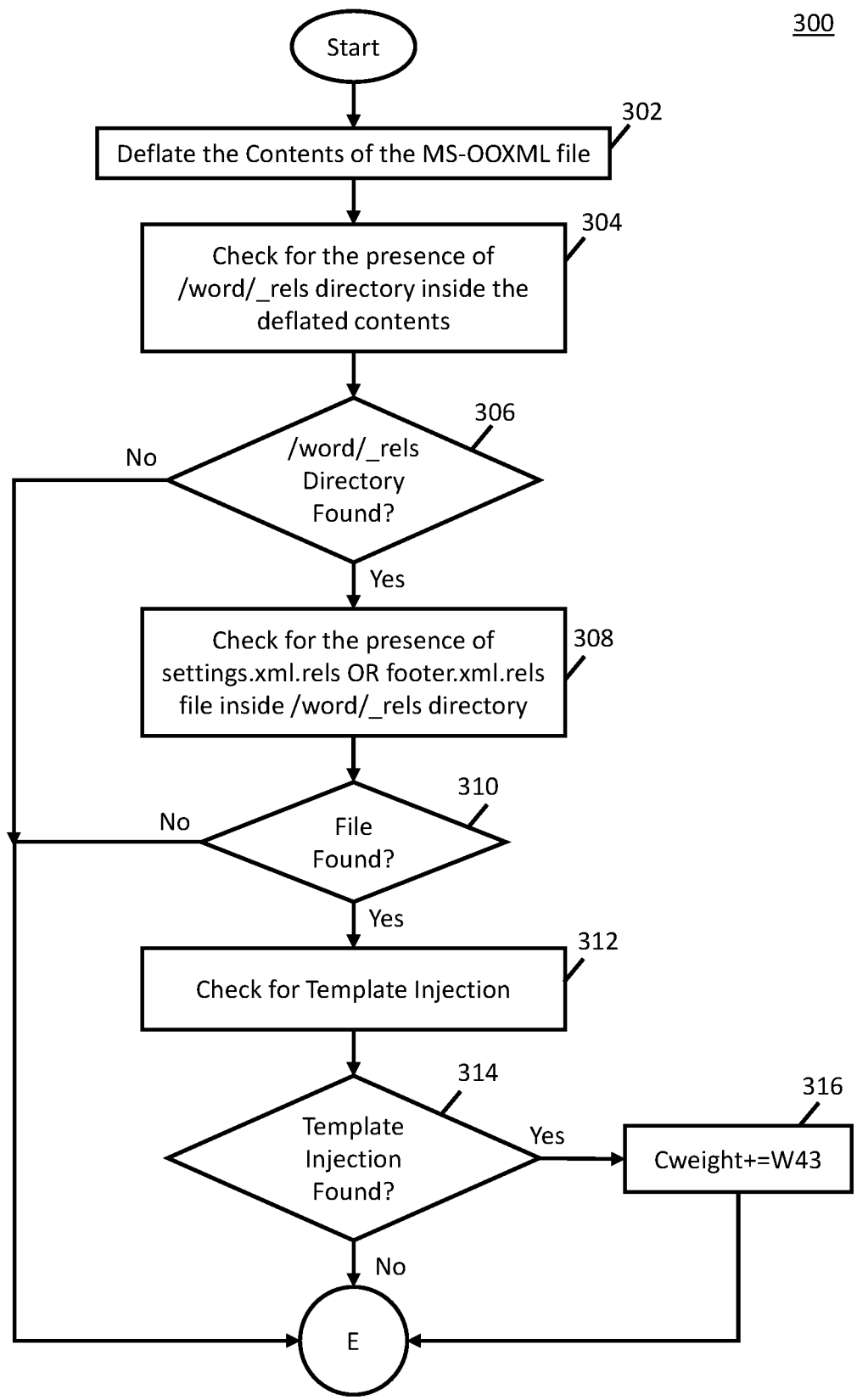
FIGS. 3A, 3B, 3C, and 3D show an example of a process for analyzing Microsoft™ Office Open XML (MS-OOXML) files in accordance with some embodiments.
Figure 3B:
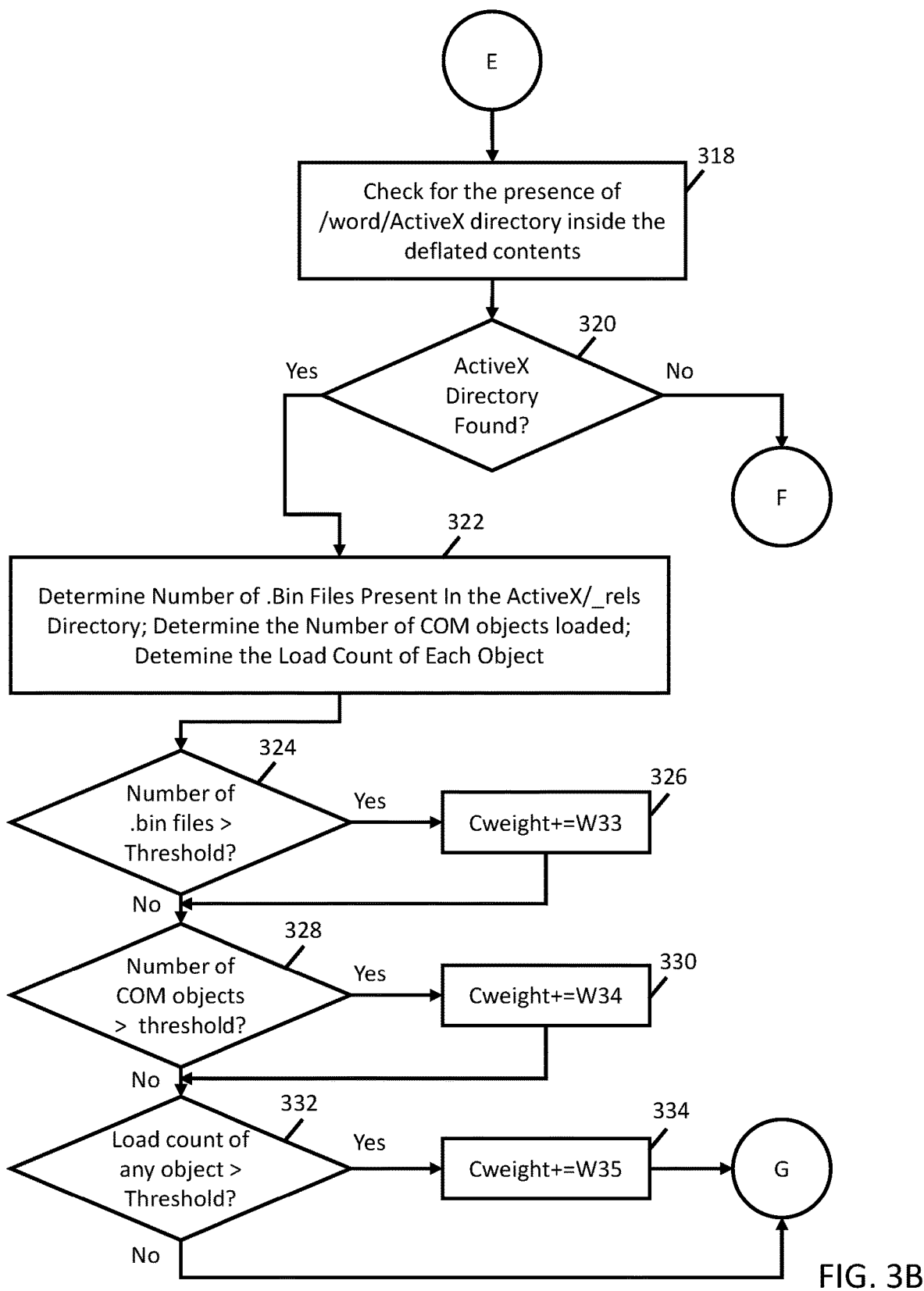
Figure 3C:
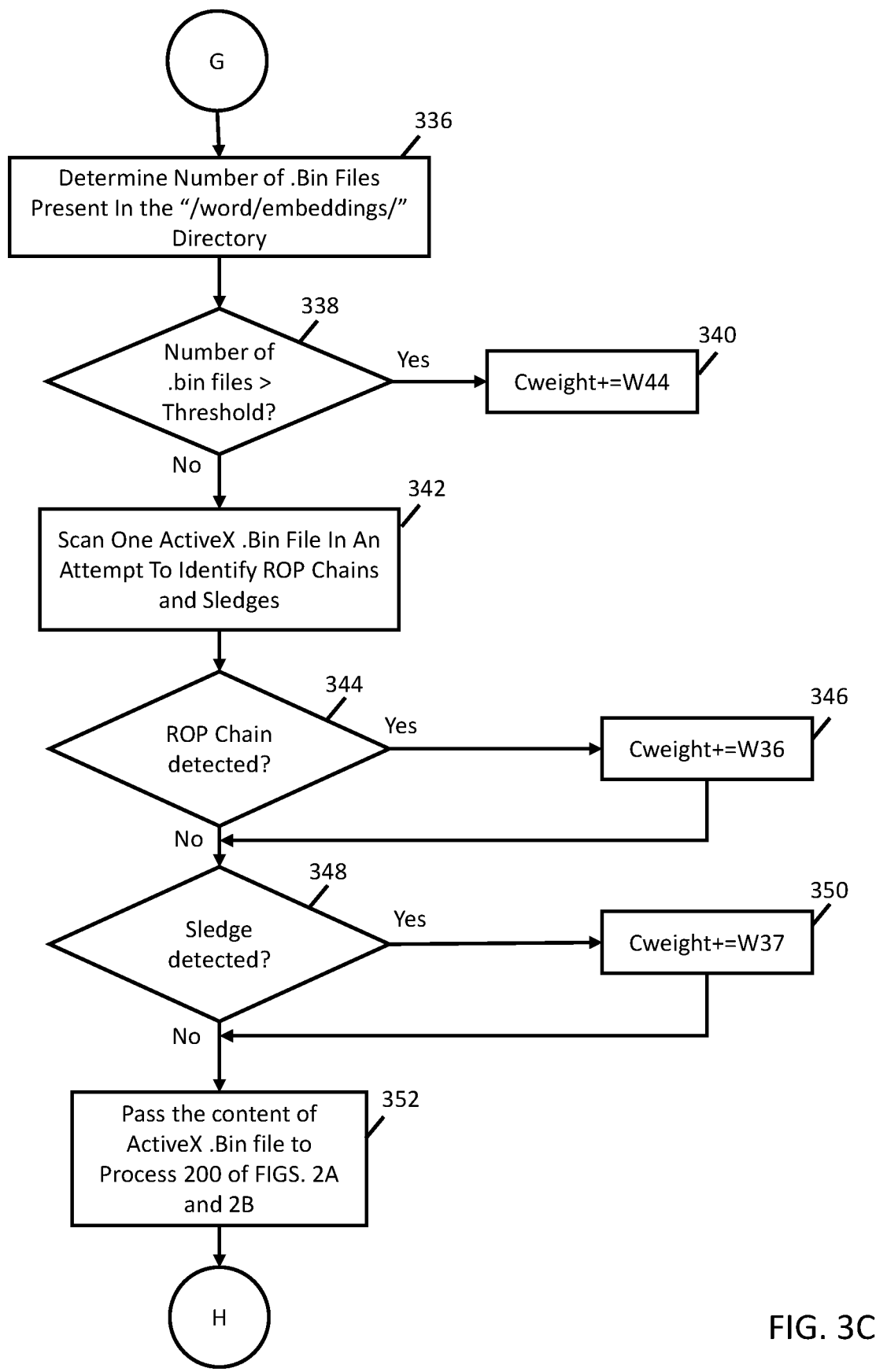
Figure 4A:
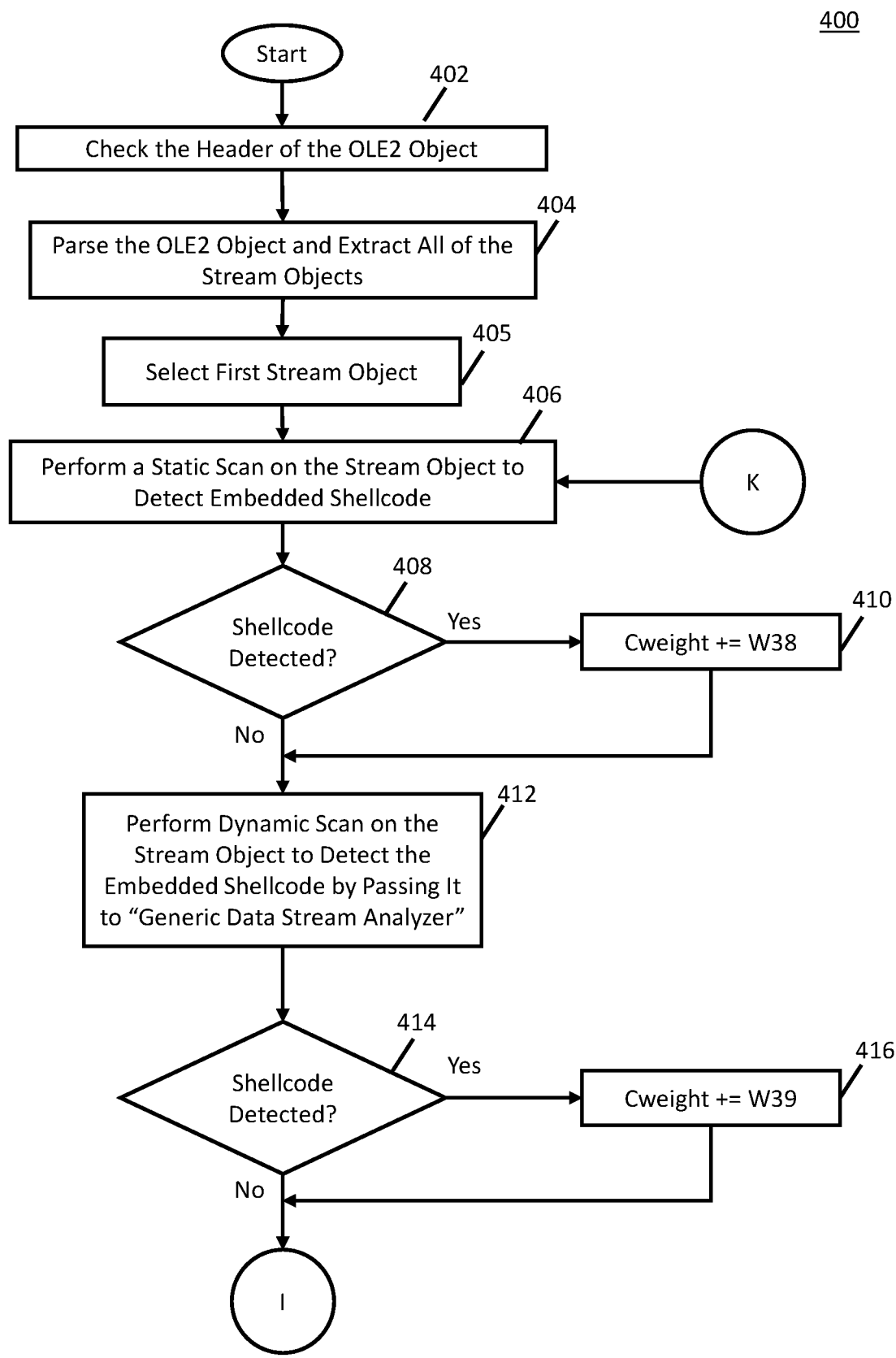
FIGS. 4A, 4B, and 4C show an example of a process for analyzing Microsoft™ Compound File Binary (MS-CFB) files in accordance with some embodiments.
Figure 4B:
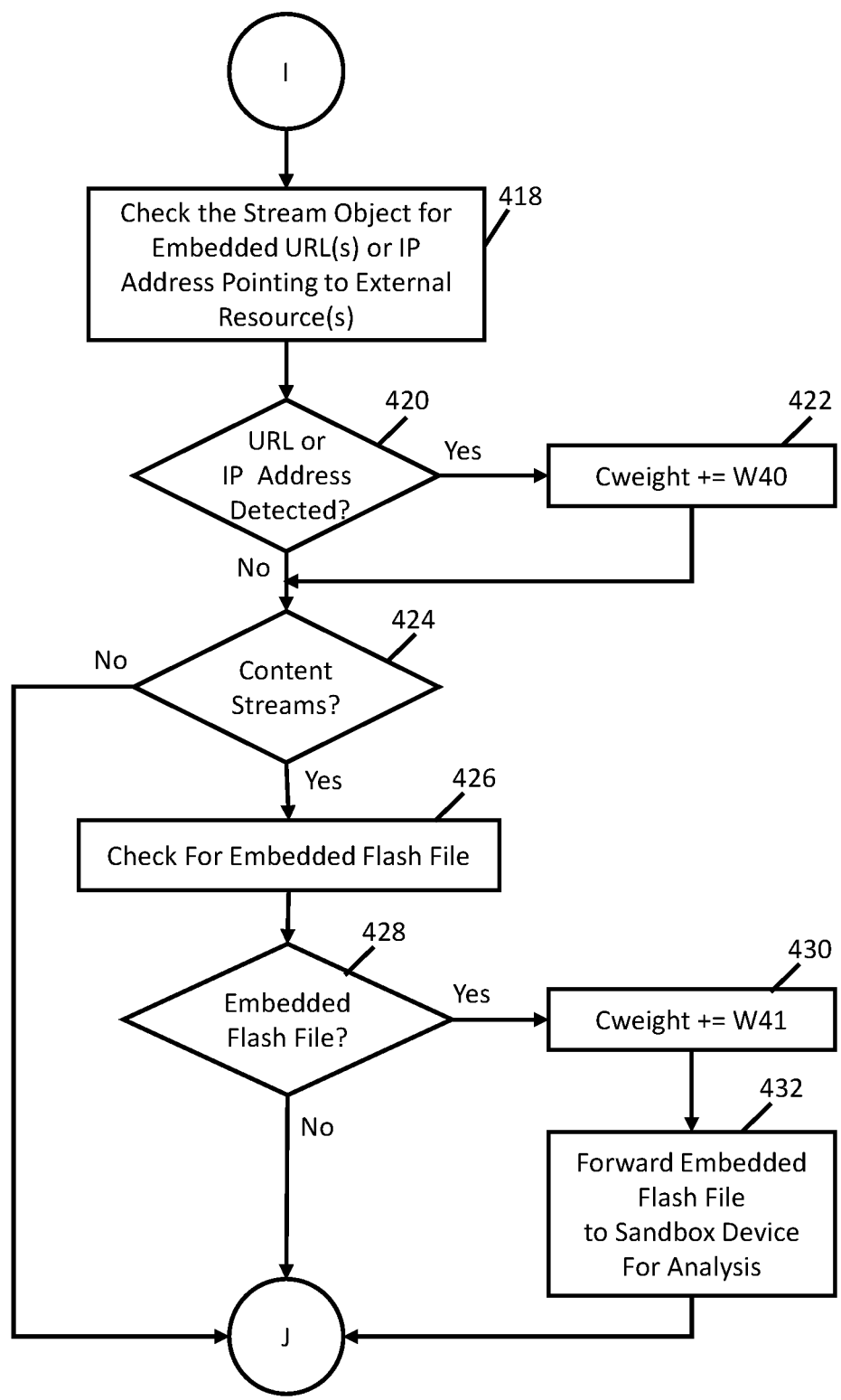
Figure 4C:
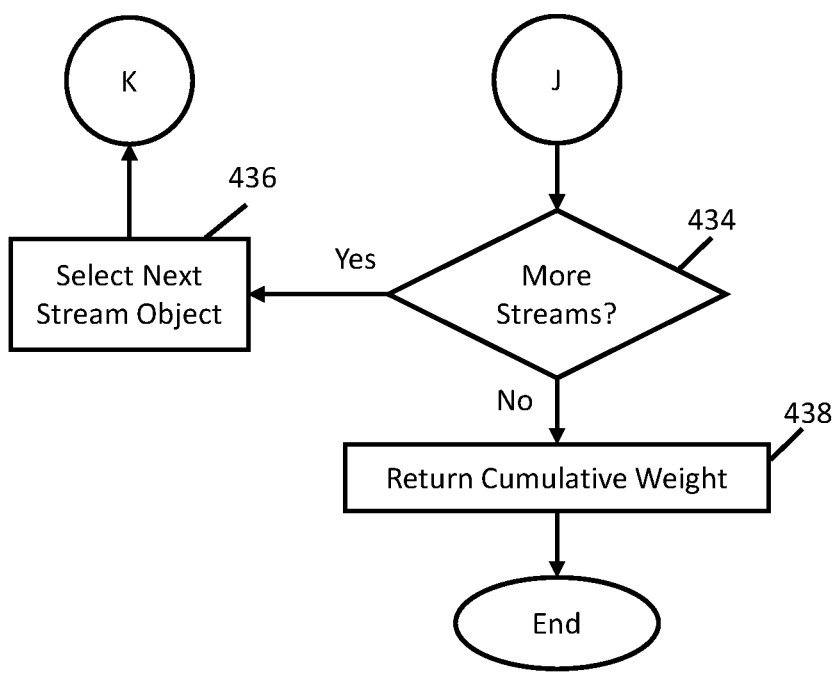
Figure 5:
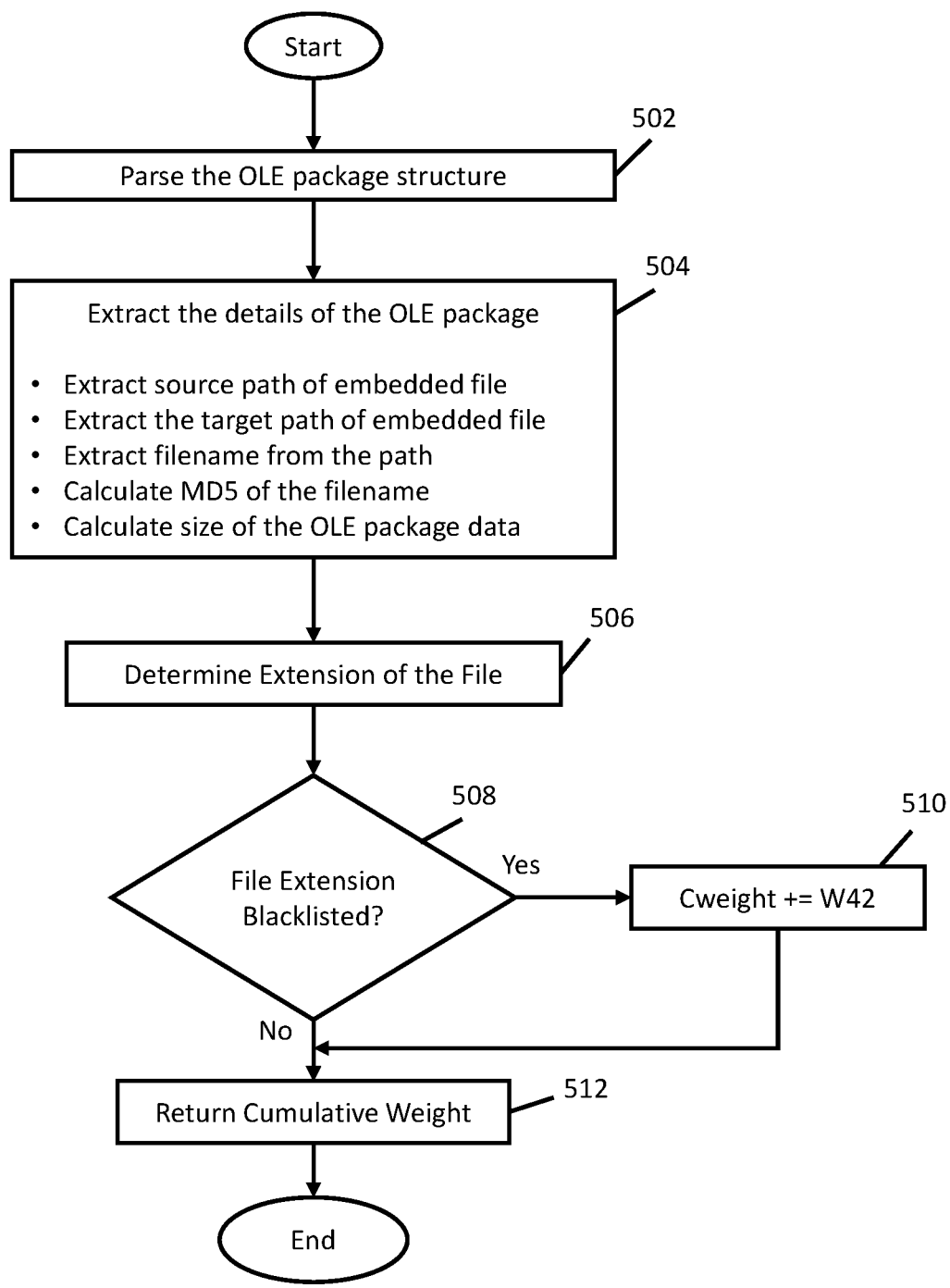
FIG. 5 shows an example of a process for analyzing Object Linking and Embedding (OLE) packages in accordance with some embodiments.

| Heuristic Type | Heuristic # | Heuristic Description | Heuristic True? | Weight Value | Dependent Heuristic # | Function |
|---|---|---|---|---|---|---|
| Dep. | 12 | Executable code detected inside embedded OLE Package | Yes | W19 | None | Analyze OLE package structure using, for example, process 500 of FIG. 5 |
|  |  |  | No | None | 13 | None |
| Ind. | 13 | Embedded object detected inside RTF file | Yes | W20 | 14 | None |
|  |  |  | No | None | 16 | None |
| Dep. | 14 | Embedded Open Office XML (OOXML) archive detected inside RTF file | Yes | W21 | None | Analyze OOXML file using, for example, process 300 of FIGS. 3A, 3B, and 3C |
|  |  |  | No | None | 15 | None |
| Dep. | 15 | Embedded Adobe document (PDF) detected inside RTF file | Yes | W22 | None | Analyzed Adobe Acrobat PDF file using any suitable analyzer |
|  |  |  | No | None | None | Analyze MS-CFB file using, for example, process 400 of FIGS. 4A, 4B, and 4C |
| Ind. | 16 | ActiveX object detected inside RTF file | Yes | W23 | 17 | None |
|  |  |  | No | None | 18 | None |
| Dep. | 17 | Embedded Flash detected inside RTF file | Yes | W24 | None | Analyze data stream using, for example, process 200 of FIGS. 2A and 2B |
|  |  |  | No | None | 18 | None |
| Ind. | 18 | Linked object detected inside RTF file | Yes | W25 | None | Analyze MS-CFB file using, for example, process 400 of FIGS. 4A, 4B, and 4C |
|  |  |  | No | None | 19 | None |
| Ind. | 19 | AutoLink object detected inside RTF file | Yes | W26 | None | Analyze MS-CFB file using, for example, process 400 of FIGS. 4A, 4B, and 4C |
|  |  |  | No | None | 20 | None |
| Ind. | 20 | OLE object with suspicious class name detected inside RTF file | Yes | W27 | None | Analyze MS-CFB file using, for example, process 400 of FIGS. 4A, 4B, and 4C |
|  |  |  | No | None | 21 | None |
| Ind. | 21 | Malformed OLE object detected inside RTF file | Yes | W28 | None | Analyze MS-CFB file using, for example, process 400 of FIGS. 4A, 4B, and 4C |
|  |  |  | No | None | 22 | None |
| Ind. | 22 | Shellcode detected inside malformed object | Yes | W29 | None | Analyze data stream using, for example, process 200 of FIGS. 2A and 2B |
|  |  |  | No | None | 23 | None |
| Dep. | 23 | Multiple malformed OLE objects detected inside RTF file | Yes | W30 | 24 | None |
|  |  |  | No | None | 24 | None |
| Dep. | 24 | Excessive number of embedded objects detected inside RTF file | Yes | W31 | None | None |
|  |  |  | No | None | None | None |

As can be seen, Table 1 includes columns for "Heuristic Type," "Heuristic #," "Heuristic Description," "Hueristic True?," "Update weight," "Dependent Heuristic #," and "Function." "Heuristic Type" can be independent (which means that the heuristic does not need to have any prior heuristics checked) or dependent (which means that the heuristic does need to have a prior heuristic checked). "Heuristic #" is simply an identifier of the heuristic and is not an indicator of order or importance of the heuristic. "Heuristic Description" describes what the heuristic is checking for. "Heuristic True?" shows that row to be applied if the heuristic is true (yes) or false (no). "Weight Value" shows the weight value to be added to Cweight if "Heuristic True?" is yes or no. "Function" shows the function to be performed if "Heuristic True?" is yes or no.

For purposes of illustration, assume that heuristic #1 has been selected.

At 120, process 100 can check the heuristic. This check can be made in any suitable manner in some embodiments based on the heuristic being checked. For example, in some embodiments, process 100 can determine whether shellcode is detected inside control word data via stream emulation.

Next, at 122, process 100 can determine whether to increase Cweight. This determination can be made in any suitable manner in some embodiments. For example, in some embodiments, depending on whether the heuristic is true ("yes" in the "Heuristic True?" column) or not ("no" in the "Heuristic True?" column), process can determine that Cweight is to be increased if there a corresponding weight value in the corresponding row of the "Weight Value" column. If process 100 determines that Cweight is to be increased, process 100 can branch to 124 at which Cweight is increased by the weight value. After increasing Cweight at 124 or if it is determined at 122 that Cweight is not to be increased, then process 100 can proceed to 126.

Then, at 126, process 100 can determine whether there are any dependent heuristics to be checked against the OLE object. This determination can be made in any suitable manner in some embodiments. For example, depending on whether the current heuristic is true ("yes" in the "Heuristic True?" column) or not ("no" in the "Heuristic True?" column), process 100 can check the corresponding row of the "Dependent Heuristic #" column to see if a heuristic number is present, and, if so, that heuristic is to be checked, otherwise, no dependent heuristic is to be checked.

If it is determined that there are one or more dependent heuristics to check, then at 128 process 100 can select a dependent heuristic. The selection can be made in any suitable manner in some embodiments. For example, process can select the dependent heuristic number of the "Dependent Heuristic #" column identified at 126.

If it is determined at 126 that there is no dependent heuristic to check, at 130, process 100 can determine whether any function(s) is/are to be performed. This determination can be made in any suitable manner in some embodiments. For example, depending on whether the current heuristic is true ("yes" in the "Heuristic True?" column) or not ("no" in the "Heuristic True?" column), process 100 can check the corresponding row of the "Function" column to see if a Function name is present, and, if so, that function is to be performed, otherwise, no function is to be performed. If it is determined that one or more functions are to be performed, then process 100 can perform those functions at 132 in any suitable manner in some embodiments.

Table 1 shows the following functions: call data stream analyzer (which can be performed by performing process 200 of FIGS. 2A and 2B in some embodiments); call MS-OOXML analyzer (which can be performed by performing process 300 of FIGS. 3A, 3B, and 3C in some embodiments); call MS-CFB analyzer (which can be performed by performing process 400 of FIGS. 4A, 4B, and 4C in some embodiments); call OLE package structure parser (which can be performed by performing process 500 of FIG. 5 in some embodiments); and call Adobe Acrobat PDF analyzer. In some embodiments, any suitable Adobe Acrobat PDF analyzer can be used in some embodiments. For example, in some embodiments, the Wepawet analyzer (which can be found at github.com/chrislee35/wepawet) can be used.

After performing one or more functions at 132 or determining that no functions are to be performed at 130, process 100 can determine if there are any more independent heuristics to check for the current OLE object at 133. This determination can be made in any suitable manner in some embodiments. For example, in some embodiments, this determination can be performed by checking for another independent heuristic in a list of heuristics to be applied for the type of the current object. If the determination is that there are more independent heuristics to check, then process can select the heuristic at 134 and loop back to 116. The next heuristic can be selected in any suitable manner in some embodiments.

After determining that there are no more heuristics to be checked for the current object at 133, process 100 can determine if there are any more OLE objects at 135. This determination can be made in any suitable manner in some embodiments. For example, in some embodiments, this determination can be performed by checking for a subsequent occurrence of the word "object" in the RTF file. If the determination is that there are more OLE objects, then process can select the next object at 136 and loop back to 116. The next object can be selected in any suitable manner in some embodiments.

If it is determined at 134 that there are no more OLE objects or if it is determined at 112 that the OLE control word "object" is not in the RTF file, then process 100 can proceed to 136 of FIG. 1C at which process 100 can check for the presence of overlay data in the RTF file. This check can be made in any suitable manner in some embodiments. For example, in some embodiments, this check can be performed by extracting any data stream existing beyond the end of the RTF file.

Next, at 138, process 100 can determine if overlay data was detected. If so, process 100 can determine if the length of the overlay data is greater than, or greater than or equal to, a threshold. This determination can be made in any suitable manner in some embodiments, and any suitable threshold can be used. If the length of the overlay is data greater than, or greater than or equal to, the threshold, then process 100 can increase Cweight by weight W32 at 142.

Finally, if no overlay data is detected at 138, if the length of the overlay data is determined to not be greater than, or greater than or equal to, the threshold at 140, or after increasing Cweight at 142, process 100 can check the cumulative weight and classify the file as described above (e.g., as clean, as suspicious, or as malicious) at 144 and then end.

Turning to FIGS. 3A, 3B, 3C, and 3D, an example, 300 of a process for analyzing Microsoft™ Office Open XML (MS-OOXML) files is shown. As illustrated, after process 300 begins, process 300 can deflate (unzip) the contents of the zipped MS-OOXML file at 302. This deflation can be performed in any suitable manner in some embodiments.

Next, at 304, process 300 can check for the presence of "/word/_rels" directory inside the deflated contents. If, at 306, process 300 determines that the "/word/_rels" directory is found inside the deflated contents, process 300 can proceed to 308. Otherwise process 300 can proceed to 318 of FIG. 3B.

At 308, process 300 can check for the presence of a "settings.xml.rels" file or a "footer.xml.rels" file inside the "/word/_rels" directory. If, at 310, process 300 determines that such a file is found in the "/word/_rels" directory, process 300 can proceed to 312. Otherwise process 300 can proceed to 318 of FIG. 3B.

At 312, process 300 can check for template injection. Checking for template injection can be performed in any suitable manner. For example, in some embodiments, template injection can be performed by checking the file "settings.xml.rels" for each "Relationship" xml tag inside the "Relationships" XML tag. If the "type" value in the Relationship" XML tag contains the string "attachedTemplate", the "Target" value contains a uniform resource locator (URL), and the "TargetMode" value is "External", then template injection can be considered to be detected.

If, at 314, process 300 determines that template injection is found, process 300 can increase Cweight by weight W43 at 316. Otherwise process 300 can proceed to 318 of FIG. 3B.

Then, at 318, process 300 can check for the presence of a "/word/ActiveX" directory inside the deflated contents. This check can be performed in any suitable manner in some embodiments. For example, in some embodiments, this check can be performed by walking through all the directories inside the deflated contents and comparing each directory name to the string ActiveX.

Next, at 320, process 300 can determine if a "/word/ActiveX" directory has been found. If so, process can proceed to 322.

At 322, process 300 can determine the number of ".bin" files present in the "/ActiveX/_rels" directory, determine the number of COM objects loaded, and determine the load count of each object. Process 300 can determine the number of ".bin" files present in the "/ActiveX/_rels" directory in any suitable manner in some embodiments. For example, in some embodiments, this determination can be made by checking all the files present in the "/ActiveX/_rels" directory and counting the number of files with the ".bin" extension. Process 300 can determine the number of COM objects loaded in any suitable manner in some embodiments. For example, in some embodiments, process 300 can determine the number of COM objects loaded by inspecting files with the extension ".xml" inside the "/ActivX/_rels/" directory, extracting the value of the xml tag "clsid" which corresponds to a COM object, and counting the number of unique values of the tag "clsid". Process 300 can determine the load count of each object in any suitable manner in some embodiments. For example, in some embodiments, process 300 can determine the load count of each object by checking how many times each clsid value appears in the xml files.

Next, at 324, process 300 can determine if the number of ".bin" files is greater than, or greater than or equal to, a threshold. Any suitable threshold (such as 20) can be used in some embodiments. If process 300 determines that the number of ".bin" files is greater than, or greater than or equal to, the threshold, then at 326, process can increase Cweight by weight W33. After increasing Cweight at 326 or determining that the number of ".bin" files is not greater than, or not greater than or equal to, the threshold at 324, process 300 can proceed to 328.

Then, at 328, process 300 can determine if the number of COM objects is greater than, or greater than or equal to, a threshold. Any suitable threshold (such as one) can be used in some embodiments. If process 300 determines that the number of COM objects is greater than, or greater than or equal to, the threshold, then at 330, process can increase Cweight by weight W34. After increasing Cweight at 330 or determining that the number of COM objects is not greater than, or not greater than or equal to, the threshold at 328 process 300 can proceed to 332.

Next, at 332, process 300 can determine if the load count of any object is greater than, or greater than or equal to, a threshold. Any suitable threshold (such as 30) can be used in some embodiments. If process 300 determines that the load count of any object is greater than, or greater than or equal to, the threshold, then at 334, process can increase Cweight by weight W35. After increasing Cweight at 334 or determining that the load count of each object is not greater than, or not greater than or equal to, the threshold at 332, process 300 can proceed to 336 of FIG. 3C.

At 336, process 300 can determine the number of ".bin" files present in the "/word/embeddings/" directory. Process 300 can determine the number of ".bin" files present in the "/word/embeddings/" directory in any suitable manner in some embodiments. For example, in some embodiments, this determination can be made by checking all the files present in the "/word/embeddings/" directory and counting the number of files with the ".bin" extension.

Next, at 338, process 300 can determine if the number of ".bin" files is greater than, or greater than or equal to, a threshold. Any suitable threshold (such as 20) can be used in some embodiments. If process 300 determines that the number of ".bin" files is greater than, or greater than or equal to, the threshold, then at 340, process can increase Cweight by weight W44. After increasing Cweight at 340 or determining that the number of ".bin" files is not greater than, or not greater than or equal to, the threshold at 338, process 300 can proceed to 342.

At 342, process 300 can scan one ActiveX ".bin" file in an attempt to identify ROP chains and sledges. This scan can be performed in any suitable manner in some embodiments. For example, in some embodiments, ROP scanning can be done by looking for chunks in the data stream that look like a chain of different consecutive or non-consecutive memory addresses. As another example, in some embodiments, sledge scanning can be done by dividing the bytes of the data stream into four-byte chunks, and checking these chunks to look for repeated memory addresses in a configured range.

Next 344, if an ROP chain is detected, process 300 can branch to 346 at which it can increase Cweight by weight W36. Otherwise, or after increasing Cweight at 346, process 300 can proceed to 348.

At 348, if a sledge is detected, process 300 can branch to 350 at which it can increase Cweight by weight W37. Otherwise, or after increasing Cweight at 350, process 300 can proceed to 352.

At 352, process 300 can pass the content of the ActiveX ".bin" file to process 200 of FIGS. 2A and 2B, which can process the file as described above.

Figure 3D:
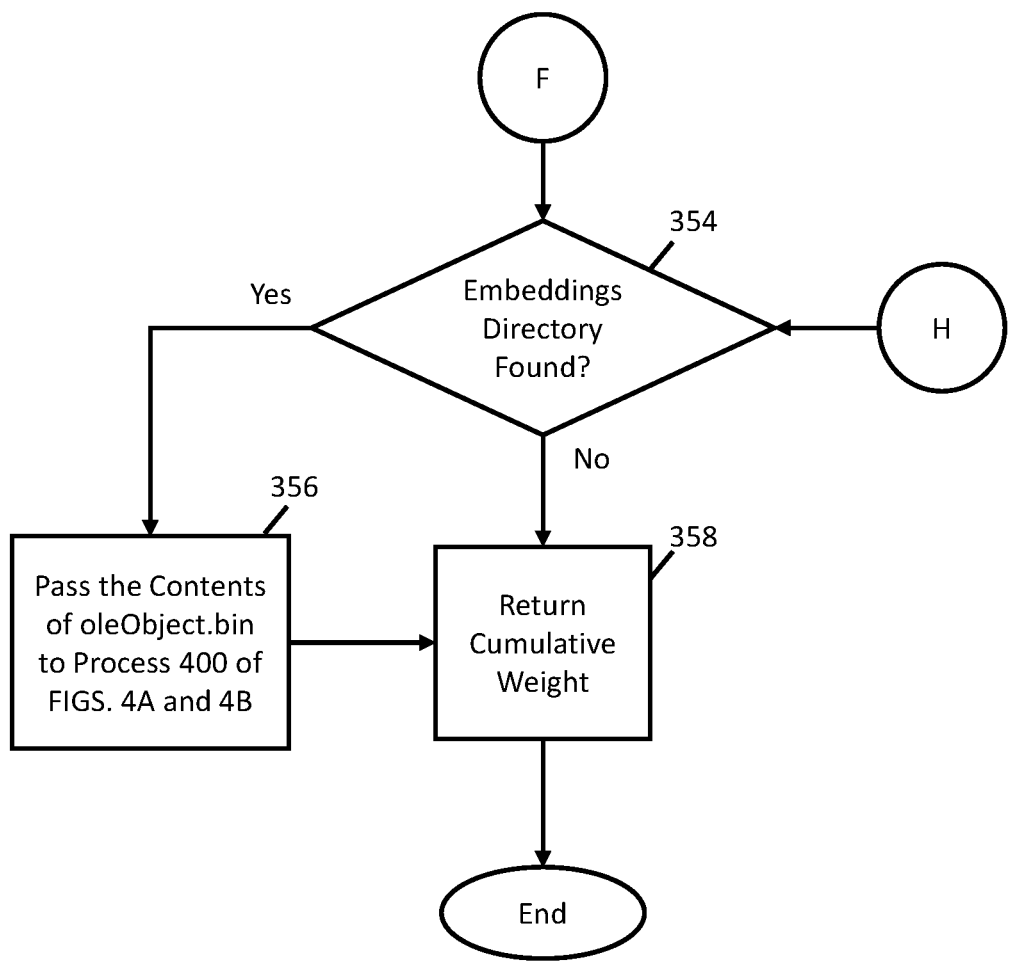

After 352 or if an ActiveX directory is not found at 320, process 300 can determine whether an embeddings directory is found in the MX-OOXML file at 354 of FIG. 3D. If an embeddings directory is found at 354, then process can pass the contents of "oleObject.bin" to process 400 of FIGS. 4A, 4B, and 4C at 356. Otherwise, or after passing the contents of "oleObject.bin" to process 400 of FIGS. 4A, 4B, and 4C at 356, process 300 can return the cumulative weight Cweight to the calling process at 358 and end.

Turning to FIGS. 4A, 4B, and 4C, an example 400 of a process for processing Microsoft™ Compound File Binary (MS-CFB) files in accordance with some embodiments is shown. As illustrated, after process 400 begins, the process checks the header of the OLE2 object for the following bytes: "d0"; "cf"; "11"; "e0"; "a1"; "b1"; "1a"; "e1".

Next, at 404, process 400 parses the OLE2 object and extracts all of the stream objects from the OLE2 object. This parsing and extraction can be performed in any suitable manner in some embodiments.

Then, at 405, process 400 can select the first stream object. This selection can be made in any suitable manner.

Next, at 406, process 400 can perform a static scan on the stream object to detect embedded shellcode. This scan can be performed in any suitable manner in some embodiments. For example, in some embodiments, this scanning can be done by matching the data stream with known shellcode bytes patterns kept in a file.

Then, at 408, process 400 can determine if shellcode has been detected. If so, process 400 can increase Cweight by weight W38 at 410. Otherwise, or after increasing Cweight at 410, process 400 can branch to 412.

At 412, process 400 can perform a dynamic scan on the stream object to detect embedded shellcode. This scanning can be performed in any suitable manner in some embodiments. For example, in some embodiments, this scanning can be done by emulating the data of the data stream on x86 based software emulator to check if it looks like x86 CPU instructions.

Then, at 414, process 400 can determine if shellcode has been detected. If so, process 400 can increase Cweight by weight W39 at 416. Otherwise, or after increasing Cweight at 416, process 400 can branch to 418 of FIG. 4B.

At 418, process 400 can check the stream object for one or more embedded uniform resource locator(s) or IP addresses pointing to external resource(s).

Next, at 420, process 400 can determine if a URL or IP address has been detected. If so, process 400 can increase Cweight by weight W40 at 422. Otherwise, or if it is determined at 420 that no URL or IP address has been detected, process 400 can proceed to 424.

At 424, process 400 can determine if there are any content streams. This determination can be made in any suitable manner in some embodiments. For example, in some embodiments, this determination can be made by checking the data stream for the name "contents".

Next, at 426, process 400 can check the stream object for an embedded Flash file or embedded PDF file. This check can be made in any suitable manner in some embodiments. For example, in some embodiments, this check be done by checking if the stream object starts with the string "CWS" or "FWS", which can indicate an embedded Flash file, or "% PDF", which can indicate an embedded PDF file.

At 428, process 400 can determine if an embedded Flash file was found at 426, and, if so, process 400 can increase Cweight by weight W41 at 430 and forward the embedded Flash file to a sandbox device for analysis at 432. Any suitable sandbox device can be used in some embodiments.

After forwarding the embedded Flash file to a sandbox device for analysis at 432, determining that no embedded Flash file is detected at 428, or determining that there are no content streams at 424, process 400 can proceed to 434 of FIG. 4C.

At 434, process 400 can determine if there are any more stream objects. If so, process 400 can select the next stream object at 436 and then loop back to 406 of FIG. 4A. Otherwise, process 400 can return the cumulative weight Cweight at 438 and end.

Turning to FIG. 5, an example 500 of a process for an OLE package structure parser in accordance with some embodiments is shown. As illustrated, after the process begins, the process parses the OLE package structure. This parsing can be performed in any suitable manner in some embodiments.

Next, at 504, process 500 can extract the details of the OLE package. Any suitable details can be extracted in any suitable manner. For example, in some embodiments, a source path of an embedded file, a target path of an embedded file, and/or a filename can be extracted. In some embodiments, processing on the details extracted from the OLE package can also be performed by process 500 at 504. For example, in some embodiments, an MD5 hash of the filename can be calculated and/or a size of OLE package data can be calculated.

Then, at 506, the extension of the file name can be determined. This determination can be made in any suitable manner in some embodiments.

At 508, process 500 can next determine whether the file extension is blacklisted. This determination can be made in any suitable manner in some embodiments. For example, in some embodiments, process 500 can compare the extension name to a data structure containing blacklisted extension names.

If it is determined at 508 that the extension is blacklisted, then, at 510, process 500 can increase Cweight by weight W42. After increasing Cweight at 510 or determining at 508 that the file extension is not blacklisted, then process 500 can return cumulative weight Cweight at 512 and end.

Figure 6:
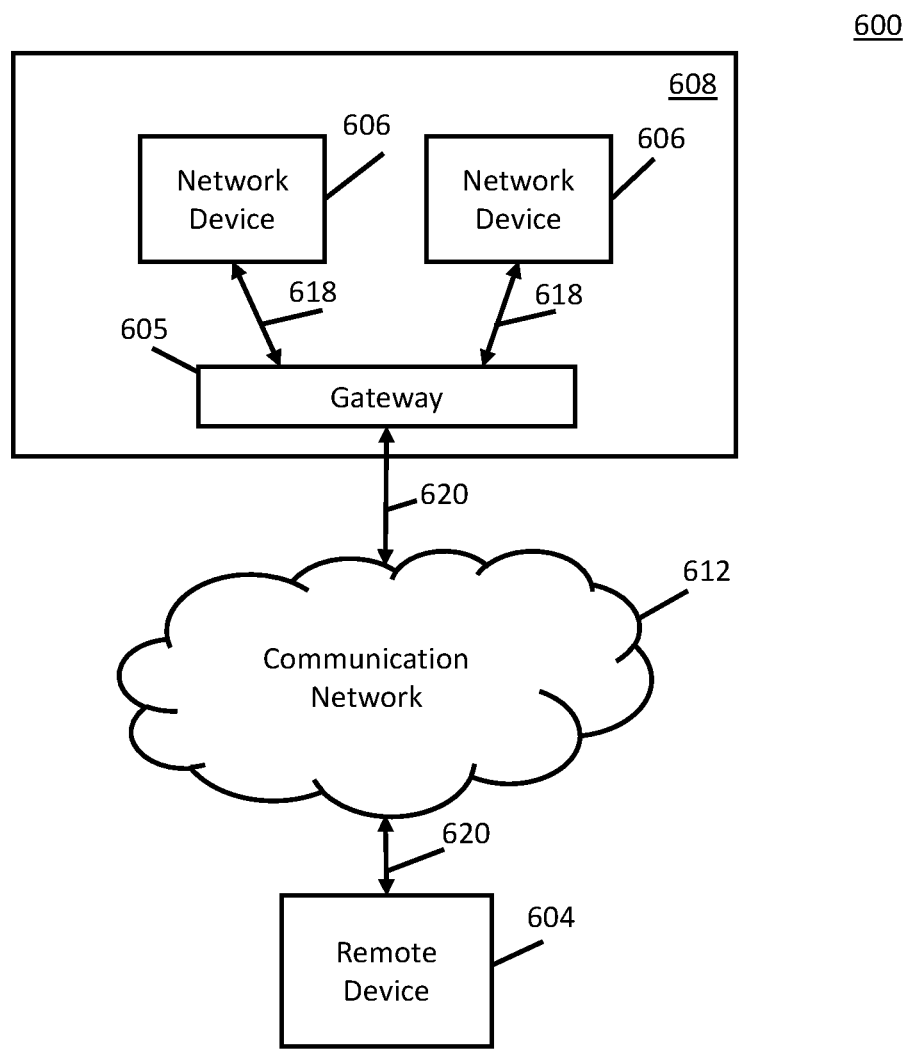
FIG. 6 shows an example of hardware that can be used in accordance with some embodiments.

Turning to FIG. 6, an example 600 of hardware that can be used in accordance with some embodiments of the disclosed subject matter is shown. As illustrated, hardware 600 can include a local area network (LAN) 608, network devices 606, a gateway 605, a communication network 612, and a remote device 604.

Although particular numbers of particular devices are illustrated in FIG. 6, any suitable number(s) of each device shown, and any suitable additional or alternative devices, can be used in some embodiments. For example, one or more additional devices, such as servers, computers, routers, networks, printers, cameras, Internet-of-Things device, etc., can be included in LAN 608 in some embodiments.

Network devices 606 can be any suitable devices in LAN 608 for receiving and processing RTF files in some embodiments. For example, in some embodiments, network devices 606 can be desktop computers, laptop computers, tablet computers, smart phones, cameras, servers, printers, smart speakers, smart displays, and/or any other device capable of processing an RTF file.

Gateway 605 can be any suitable device for connecting other devices in LAN 608 (such as network devices 606) to devices and/or networks outside LAN 608 in some embodiments. In some embodiments, gateway 605 can perform the process illustrated in, and described in connection with, FIGS. 1A, 1B, 1C, 2A, 2B, 3A, 3B, 3C, 4A, 4B, 4C, and 5. In some embodiments, gateway 605 can monitor traffic, including RTF files, passing through it in any direction and block, quarantine, pass, and/or take any other action on traffic based on a classification applied as described above. In some embodiments, gateway 605 may provide a firewall function, a routing function, and/or any other suitable function.

Communication network 612 can be any suitable combination of one or more wired and/or wireless networks in some embodiments. For example, in some embodiments, communication network 612 can include any one or more of the Internet, a mobile data network, a satellite network, a local area network, a wide area network, a telephone network, a cable television network, a WiFi network, a WiMax network, and/or any other suitable communication network.

In some embodiments, communication network 612 and the devices connected to it can form or be part of a wide area network (WAN).

Remote device 604 can be any suitable device sending RTF files to a network device 606 in LAN 608. For example, in some embodiments, remote device 604 can be a desktop computer, a laptop computer, a tablet computer, a smart phone, a smart display, a server, and/or any other suitable device.

Gateway 605 and remote device 604 can be connected by one or more communications links 620 to communication network 612. These communications links can be any communications links suitable for communicating data among gateway 605, remote device 604, and communication network 612, such as network links, dial-up links, wireless links, hard-wired links, routers, switches, any other suitable communications links, or any suitable combination of such links.

Gateway 605 and network devices 606 can be connected by one or more communications links 618. These communications links can be any communications links suitable for communicating data among gateway 605 and network devices 606, such as network links, dial-up links, wireless links, hard-wired links, routers, switches, any other suitable communications links, or any suitable combination of such links.

Figure 7:
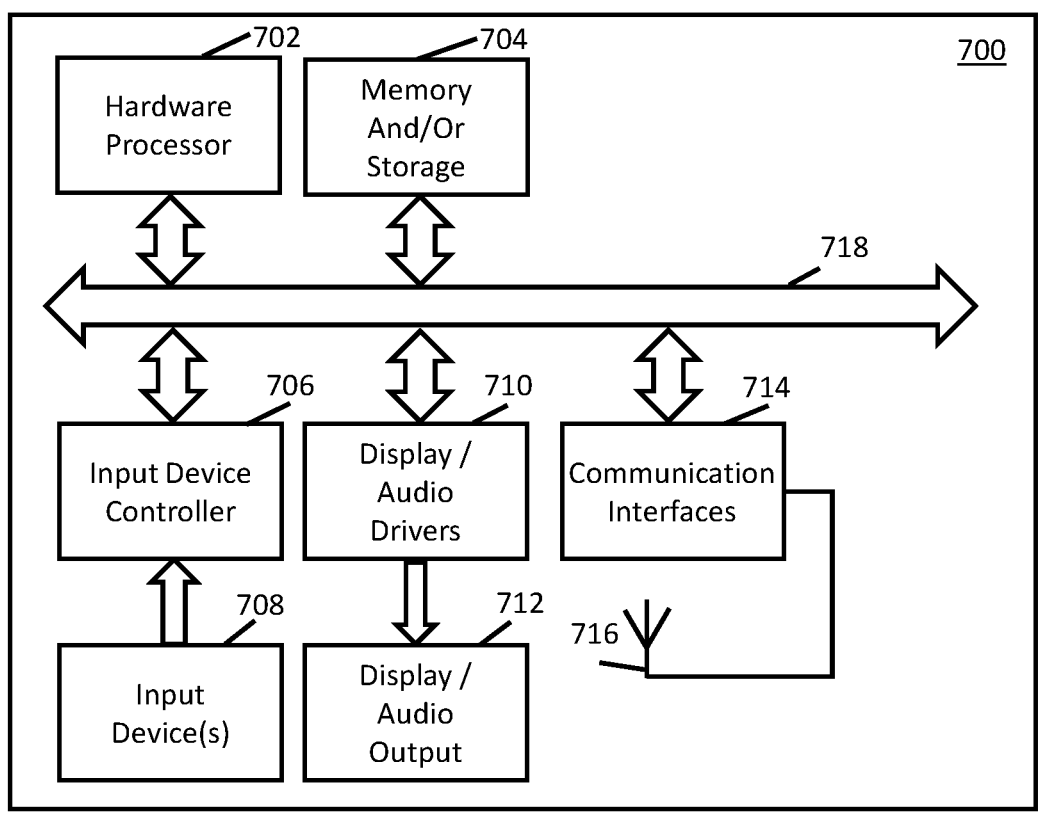
FIG. 7 shows an example of more particular hardware that can be used for certain of the components shown in FIG. 6 in accordance with some embodiments.

Network devices 606, gateway 605, and remote device 604 can be implemented using any suitable hardware in some embodiments. For example, in some embodiments, network devices 606, gateway 605, and remote device 604 can be implemented using any suitable general-purpose computer or special-purpose computer(s). For example, gateway 605 can be implemented using a special-purpose computer. Any such general-purpose computer or special-purpose computer can include any suitable hardware. For example, as illustrated in example hardware 700 of FIG. 7, such hardware can include hardware processor 702, memory and/or storage 704, an input device controller 706, an input device 708, display/audio drivers 710, display and audio output circuitry 712, communication interface(s) 714, an antenna 716, and a bus 718.

Hardware processor 702 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 704 can be any suitable memory and/or storage for storing programs, data, and/or any other suitable information in some embodiments. For example, memory and/or storage 704 can include random access memory, read-only memory, Flash memory, hard disk storage, optical media, and/or any other suitable memory.

Input device controller 706 can be any suitable circuitry for controlling and receiving input from input device(s) 708 in some embodiments. For example, input device controller 706 can be circuitry for receiving input from an input device 708, such as a touch screen, from one or more buttons, from a voice recognition circuit, from a microphone, from a camera, from an optical sensor, from an accelerometer, from a temperature sensor, from a near field sensor, and/or any other type of input device.

Display/audio drivers 710 can be any suitable circuitry for controlling and driving output to one or more display/audio output circuitries 712 in some embodiments. For example, display/audio drivers 710 can be circuitry for driving one or more display/audio output circuitries 212, such as an LCD display, a speaker, an LED, or any other type of output device.

Communication interface(s) 714 can be any suitable circuitry for interfacing with one or more communication networks, such as network 612 as shown in FIG. 6. For example, interface(s) 714 can include network interface card circuitry, wireless communication circuitry, and/or any other suitable type of communication network circuitry.

Antenna 716 can be any suitable one or more antennas for wirelessly communicating with a communication network in some embodiments. In some embodiments, antenna 716 can be omitted when not needed.

Bus 718 can be any suitable mechanism for communicating between two or more components 702, 704, 706, 710, and 714 in some embodiments.

Any other suitable components can additionally or alternatively be included in hardware 700 in accordance with some embodiments.

It should be understood that at least some of the above described blocks of the processes of FIGS. 1A, 1B, 1C, 2A, 2B, 3A, 3B, 3C, 4A, 4B, 4C, and 5 can be executed or performed in any order or sequence not limited to the order and sequence shown in and described in the figures. Also, some of the above blocks of the processes of FIGS. 1A, 1B, 1C, 2A, 2B, 3A, 3B, 3C, 4A, 4B, 4C, and 5 can be executed or performed substantially simultaneously where appropriate or in parallel to reduce latency and processing times. Additionally or alternatively, some of the above described blocks of the processes of FIGS. 1A, 1B, 1C, 2A, 2B, 3A, 3B, 3C, 4A, 4B, 4C, and 5 can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for protecting network devices from malicious rich text format (RTF) files, comprising:
   memory; and
   a hardware processor coupled to the memory and configured to:
   intercept an RTF file destined for a network device;
   parse the RTF file to identify a plurality of objects in the RTF file;
   check a first object of the plurality of objects for a first heuristic;
   based upon an outcome of the checking of the first object for the first heuristic, increase a cumulative weight by a first weight value;
   compare the cumulative weight against at least one threshold to classify the RTF file;
   based on the classification of the RTF file, take a protective action on the RTF file: and
   for each of a plurality of non-object-linking-and-embedding control words in the RTF file:
   identify the non-object-linking-and-embedding control word in the RTF file; and
   check a data stream associated with the non-object-linking-and-embedding control word for at least one of: static shell code; dynamic shellcode; an embedded file; a Flash file; encryption; a sledge, and return-oriented- programming code.

2. The system of claim 1, wherein the hardware processor is further configured to:
   based upon the outcome of the checking of the first object for the first heuristic, check the first object for a second heuristic; and
   based upon an outcome of the checking of the first object for the second heuristic, increase the cumulative weight by a second weight value.

3. The system of claim 1, wherein the protective action includes quarantining the RTF file.

4. The system of claim 1, wherein the hardware processor is further configured to:
   identify overlay data in the RTF file;
   determine a length of the overlay data; and
   increase the cumulative weight if the length of the overlay data is greater than a threshold.

5. The system of claim 1, wherein the hardware processor is further configured to:
   identify a MicrosoftTM Office Open XML (MS-OOXML) file in the RTF file; and
   increase the cumulative weight based on the contents of the MS-OOXML file.

6. The system of claim 1, wherein the hardware processor is further configured to:
   identify a MicrosoftTM Compound File Binary (MS-CFB) file in the RTF file; and
   increase the cumulative weight based on the contents of the MS-CFB file.

7. A method for protecting network devices from malicious rich text format (RTF) files, comprising:
   intercepting an RTF file destined for a network device;
   parsing the RTF file to identify a plurality of objects in the RTF file;
   checking a first object of the plurality of objects for a first heuristic;
   based upon an outcome of the checking of the first object for the first heuristic, increasing a cumulative weight by a first weight value;
   comparing the cumulative weight against at least one threshold to classify the RTF file;
   based on the classification of the RTF file, taking a protective action on the RTF file; and for each of a plurality of non-object-linking-and-embedding control words in the RTF file:
   identifying the non-object-linking-and-embedding control word in the RTF file; and
   checking a data stream associated with the non-object-linking-and-embedding control word for at least one of: static shell code; dynamic shellcode; an embedded file; a Flash file; encryption; a sledge, and return-oriented-programming code.

8. The method of claim 7, further comprising:
   based upon the outcome of the checking of the first object for the first heuristic, checking the first object for a second heuristic; and
   based upon an outcome of the checking of the first object for the second heuristic, increasing the cumulative weight by a second weight value.

9. The method of claim 7, wherein the protective action includes quarantining the RTF file.

10. The method of claim 7, further comprising:
    identifying overlay data in the RTF file;
    determining a length of the overlay data; and
    increasing the cumulative weight if the length of the overlay data is greater than a threshold.

11. The method of claim 7, further comprising:
    identifying a MicrosoftTM Office Open XML (MS-OOXML) file in the RTF file; and
    increasing the cumulative weight based on the contents of the MS-OOXML file.

12. The method of claim 7, further comprising:
    identifying a MicrosoftTM Compound File Binary (MS-CFB) file in the RTF file; and
    increasing the cumulative weight based on the contents of the MS-CFB file.

13. A non-transitory computer-readable medium containing computer executable instructions that, when executed by a processor, cause the processor to perform a method for protecting network devices from malicious rich text format (RTF) files, the method comprising:
    intercepting an RTF file destined for a network device;
    parsing the RTF file to identify a plurality of objects in the RTF file;
    checking a first object of the plurality of objects for a first heuristic;
    based upon an outcome of the checking of the first object for the first heuristic, increasing a cumulative weight by a first weight value;
    comparing the cumulative weight against at least one threshold to classify the RTF file;
    based on the classification of the RTF file, taking a protective action on the RTF file; and
    for each of a plurality of non-object-linking-and-embedding control words in the RTF file:
    identifying the non-object-linking-and-embedding control word in the RTF file; and
    checking a data stream associated with the non-object-linking-and-embedding control word for at least one of: static shell code; dynamic shellcode; an embedded file; a Flash file; encryption; a sledge, and return-oriented-programming code.

14. The non-transitory computer-readable medium of claim 13, wherein the method further comprises:
- based upon the outcome of the checking of the first object for the first heuristic, checking the first object for a second heuristic; and
- based upon an outcome of the checking of the first object for the second heuristic, increasing the cumulative weight by a second weight value.

15. The non-transitory computer-readable medium of claim 13, wherein the protective action includes quarantining the RTF file.

16. The non-transitory computer-readable medium of claim 13, wherein the method further comprises:
- identifying overlay data in the RTF file;
- determining a length of the overlay data; and
- increasing the cumulative weight if the length of the overlay data is greater than a threshold.

17. The non-transitory computer-readable medium claim 13, wherein the method further comprises:
- identifying a MicrosoftTM Office Open XML (MS-OOXML) file in the RTF file; and
- increasing the cumulative weight based on the contents of the MS-OOXML file.

\* \* \* \* \*

UNITED STATES PATENT AND TRADEMARK OFFICE
CERTIFICATE OF CORRECTION

PATENT NO. : 11,659,000 B2  
APPLICATION NO. : 16/953865  
DATED : May 23, 2023  
INVENTOR(S) : Chintan Shah Page 1 of 1

It is certified that error appears in the above-identified patent and that said Letters Patent is hereby corrected as shown below:

In the Claims

Column 21, Claim 17, Lines 18-19:
"The non-transitory computer-readable medium claim 13, wherein"
Should be:
--The non-transitory computer-readable medium of claim 13, wherein--

Signed and Sealed this
Twenty-sixth Day of December, 2023

Katherine Kelly Vidal
*Director of the United States Patent and Trademark Office*